United States Patent
Delporte (10) Patent No.: US 9,223,681 B2
(45) Date of Patent: Dec. 29, 2015

(54) AUTOMATED DEBUG TRACE SPECIFICATION

(71) Applicant: International Business Machines Corporation, Armonk, NY (US)

(72) Inventor: Franck Delporte, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 13/768,396

(22) Filed: Feb. 15, 2013

(65) Prior Publication Data

US 2014/0237454 A1 Aug. 21, 2014

(51) Int. Cl.
*G06F 9/44* (2006.01)
*G06F 11/36* (2006.01)
*G06F 11/07* (2006.01)

(52) U.S. Cl.
CPC ........ *G06F 11/3636* (2013.01); *G06F 11/0721* (2013.01); *G06F 11/0778* (2013.01); *G06F 11/362* (2013.01); *G06F 11/366* (2013.01); *G06F 11/3692* (2013.01)

(58) Field of Classification Search
CPC .. G06F 11/36–11/3696; G06F 11/362–11/366
See application file for complete search history.

(56) References Cited

U.S. PATENT DOCUMENTS

| | | | |
|---|---|---|---|
| 6,269,478 B1 * | 7/2001 | Lautenbach-Lampe et al. | 717/127 |
| 6,507,805 B1 | 1/2003 | Gordon et al. | |
| 7,363,615 B2 | 4/2008 | Krishnaswamy et al. | |
| 8,234,633 B2 | 7/2012 | Schneider et al. | |
| 8,296,740 B2 * | 10/2012 | Roesner et al. | 717/128 |
| 2004/0205409 A1 | 10/2004 | Wu et al. | |
| 2005/0193036 A1 * | 9/2005 | Phillips et al. | 707/202 |
| 2006/0195731 A1 | 8/2006 | Patterson et al. | |
| 2007/0055914 A1 * | 3/2007 | Chandwani et al. | 714/47 |
| 2008/0178159 A1 * | 7/2008 | Roesner et al. | 717/128 |
| 2008/0244534 A1 | 10/2008 | Golender et al. | |
| 2009/0049428 A1 * | 2/2009 | Cozmei | 717/128 |
| 2009/0132861 A1 * | 5/2009 | Costa et al. | 714/45 |
| 2009/0187791 A1 | 7/2009 | Dowling et al. | |
| 2009/0193397 A1 * | 7/2009 | Chithambaram et al. | 717/128 |
| 2009/0204949 A1 * | 8/2009 | Howland et al. | 717/128 |
| 2011/0067008 A1 * | 3/2011 | Srivastava et al. | 717/128 |
| 2011/0083123 A1 * | 4/2011 | Lou et al. | 717/125 |
| 2011/0283263 A1 * | 11/2011 | Gagliardi et al. | 717/130 |
| 2011/0283264 A1 | 11/2011 | Gagliardi | |

(Continued)

OTHER PUBLICATIONS

Narayanasamy, Satish, et al., "BugNet: Continuously Recording Program Execution for Deterministic Replay Debugging", 2005, pp. 1-12.*

(Continued)

*Primary Examiner* — Thuy Dao
*Assistant Examiner* — Christopher Franco
(74) *Attorney, Agent, or Firm* — David Woycechowsky; William H. Hartwell (57) ABSTRACT

Debugging a debug target software by: (i) generating a first log file set, including at least one log file, based upon how the computer hardware set executes the instructions of the computer software set; (ii) responsive to a first error in the execution of the computer software set, examining at least a portion of the first log file set; and (iii) creating, based at least in part upon the examination of the first log file set, augmented logging instructions for generating augmented logging information, which is helpful for debugging.

12 Claims, 6 Drawing Sheets

(56) References Cited

U.S. PATENT DOCUMENTS

2011/0283265 A1* 11/2011 Gagliardi et al. .............. 717/130
2014/0351797 A1* 11/2014 Kalayci ......................... 717/127

OTHER PUBLICATIONS

Yuan, Ding, et al., "Improving Software Diagnosability via Log Enhancement", 2012, pp. 4:1-4:28.*
Andrews, James H. et al., "General Test Result Checking With Log File Analysis", 2003, pp. 634-648.*
Zamfir, Cristian et al., "Execution Synthesis: A Technique for Automated Software Debugging", 2010, pp. 321-334.*
Tu, Dan, et al., "A Method of Log File Analysis for Test Oracle", 2009, pp. 351-354.*
Polovtcev, Aleksandr et al., "Visualization of parallel program execution for software behavior analysis and defect detection", 2014, Abstract.*
Hiramatsu, Masami. "[PATCH—tip—v13 00/11] tracing: kprobe-based event tracer and x86 instruction decoder [LWN.net]," Jul. 24, 2009, <http://lwn.net/Articles/343345/>.
Hiramatsu, Masami. "Dynamic Event Tracing in Linux Kernel," 4th Linux Foundation Collaboration Summit, Apr. 15, 2010, Copyright © 2010 Hitachi Data Systems, pp. 1-35 <https://events.linuxfoundation.org/slides/lfcs2010_hiramatsu.pdf>.
Lambert, John. "Using stack traces to identify failed executions in a Java distributed system"; Department of Electrical Engineering and Computer Science Case Western Reserve University; Aug. 2002; Retrieved from <http://radio-weblogs.com/0106756/gems/thesis/entire-thesis.pdf>.
Mehregani, Navid. "Eclipse Test and Performance Tools Platform Project—Creating Custom Profilers with Probekit," Copyright 2006 IBM Corporation and others. <http://www.eclipse.org/tptp/platform/documents/probekit/probekit.html>.
Moore, Richard J. "A Universal Dynamic Trace for Linux and Other Operating Systems," USENIX Annual Technical Conference 2001, Jun. 30, 2001, Boston, USA.
"Babel Obfuscator User's Guide," Version 6.1.0.0, Copyright © 2011-2012 babelfor.NET, pp. 1-124, <http://www.babelfor.net/Media/Default/Downloads/UserGuide.pdf>.
"DTrace—Wikipedia, the free encyclopedia," Wikipedia®, Wikimedia Foundation, Inc., page last modified on Oct. 15, 2012 <http://en.wikipedia.org/wiki/DTrace>.
"Dynamic Binary Instrumentation—Tracing Wiki," page last modified on Jan. 29, 2009, <http://web.archive.org/web/20100210140018/http://lttng.org/tracingwiki/index.php/Dynamic_Binary_Instrumentation>.
"perf-probe(1): Define new dynamic tracepoints—Linux man page," date printed Dec. 3, 2012, <http://linux.die.net/man/1/perf-probe>.
"ProbeVue Dynamic Tracing Facility," page printed Dec. 3, 2012 <http://pic.dhe.ibm.com/infocenter/aix/v6r1/topic/com.ibm.aix.genprogc/doc/genprogc/probevue_userguide.htm>.
Marek, et al. "Java Bytecode Instrumentation Made Easy: The DiSL Framework for Dynamic Program Analysis", pp. 256-263, © Springer-Verlag Berlin Heidelberg 2012.

* cited by examiner

AUTOMATED DEBUG TRACE SPECIFICATION

FIELD OF THE INVENTION

The present invention relates generally to the field of software support and more particularly to debug instrumentation that uses traces.

BACKGROUND OF THE INVENTION

Debugging is known. Debugging is a methodical process of finding and reducing the number of defects (sometimes referred to as "bugs" or errors) in a computer program. Debugging includes numerous aspects, such as: (i) interactive debugging; (ii) control flow; (iii) integration testing; (iv) log files; (v) monitoring (application, system); (vi) memory dumps; (vii) profiling; (viii) Statistical Process Control; and (ix) design strategies to improve detection of bugs.

A debugging technique called "throwing an exception" is known. "Throwing an exception" refers to intentional creation of a new "exception" to notify a computer program that a potential error occurred in some piece of software (sometimes referred to herein as the "debug-target software") that is, or recently was, being executed. The phrase to "catch an exception" refers to methods of dealing with a potential error which allow the debug-target software to continue running.

Logging and tracing are known debugging techniques. Tracing is a use of logging to record information about execution of debug-target software for debugging and/or diagnostic purposes.

SUMMARY

According to the present invention, there is a method for using a computer hardware set to execute instructions of a computer software set. The method includes the following steps (not necessarily in the following order): (i) generating a first log file set, including at least one log file, based upon how the computer hardware set executes the instructions of the computer software set; (ii) responsive to a first error in the execution of the computer software set, examining at least a portion of the first log file set; and (iii) creating, based at least in part upon the examination of the first log file set, augmented logging instructions for generating augmented logging information upon any occurrence of an error similar to the first error. At least a portion of the augmented logging information is not included in the first log file set. The examining and creating steps are performed automatically and substantially without human intervention, by agent software running on the computer hardware set.

DETAILED DESCRIPTION

The DETAILED DESCRIPTION section will be divided into the following sub-sections: (i) The Hardware and Software Environment; (ii) Operation of Embodiment(s) of the Present Invention; (iii) Further Comments and/or Embodiment(s); and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
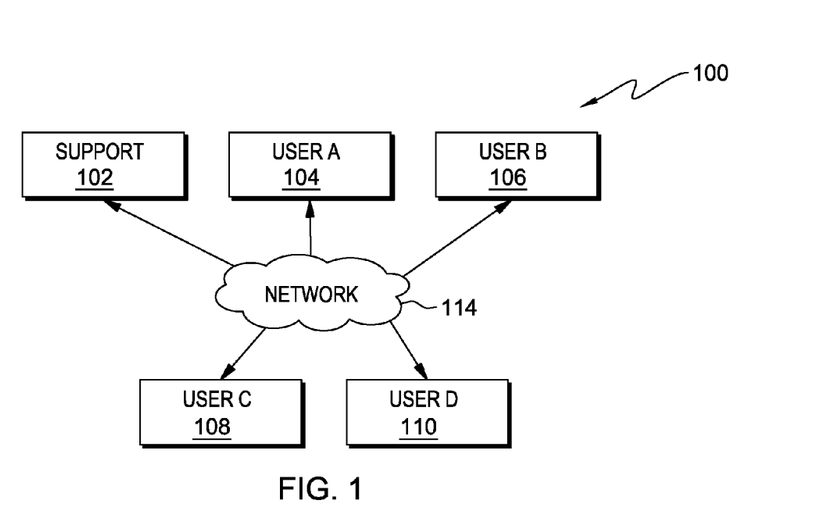
FIG. 1 is a schematic view of a first embodiment of a computer system according to the present invention.
Figure 2:
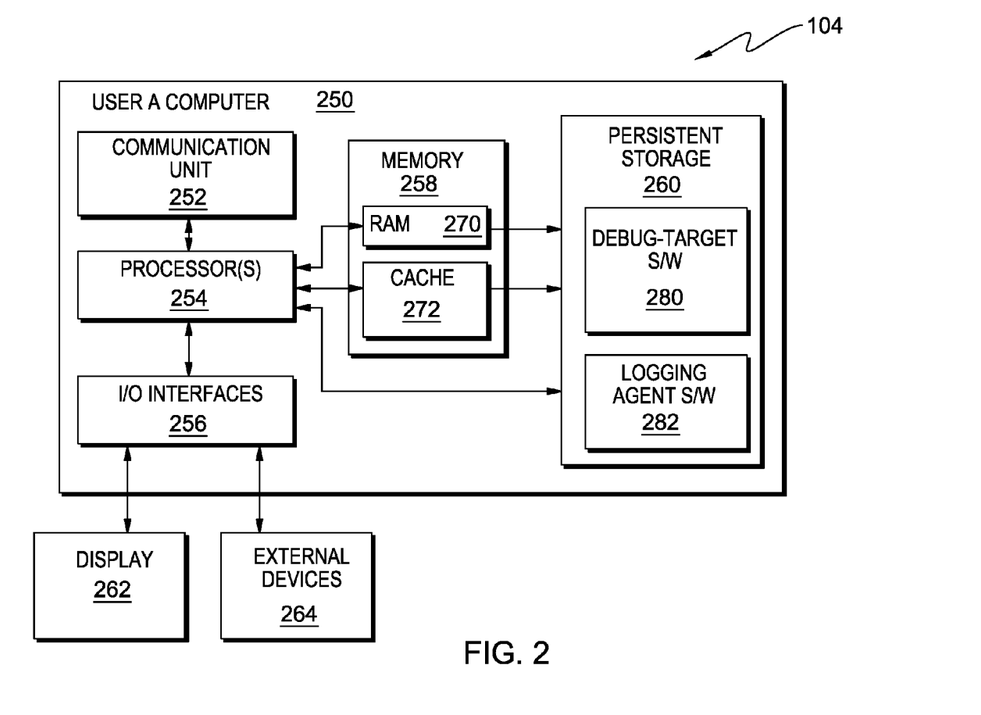
FIG. 2 is a schematic view of a portion of the first embodiment computer system.
Figure 3:
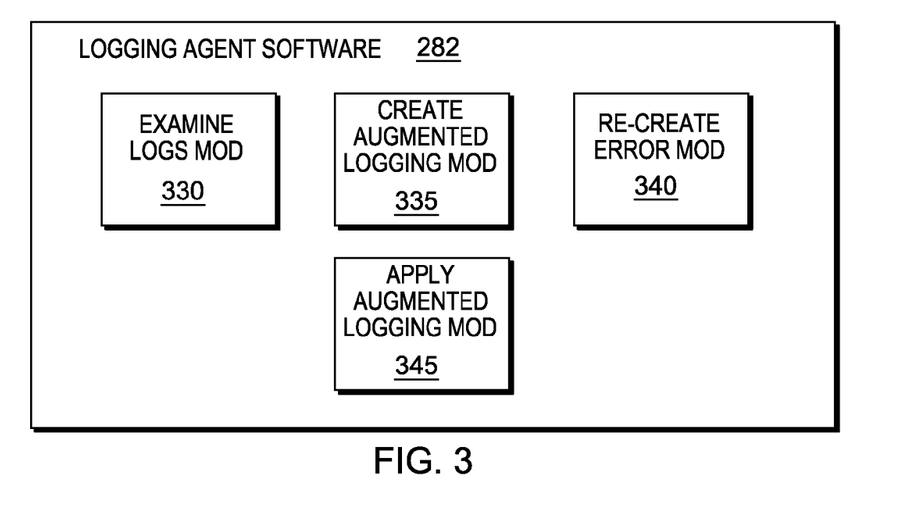
FIG. 3 is a schematic view of a portion of the first embodiment computer system.

The present invention will now be described in detail with reference to the Figures. FIGS. 1, 2, and 3 collectively make up a functional block diagram illustrating various portions of distributed data processing system (or computer system) 100, including: support sub-system 102; user A sub-system 104; user B sub-system 106; user C sub-system 108; and user D sub-system 110. As shown in FIG. 2, user A sub-system 104 includes: user A computer 250; communication unit 252; processor(s) (or processor set) 254; input/output (i/o) unit 256; memory device 258; persistent storage device 260; display device 262; external device set 264; random access memory (RAM) device 270; cache memory device 272; debug-target software (sometimes also more simply referred to as "application") 280; and logging agent software (s/w) 282. As shown in FIG. 3, logging agent s/w 282 includes: examine logs module (mod) 330; create augmented logging mod 335; recreate error mod 340; and apply augmented logging mod 345.

Logging agent s/w 282 (see FIG. 2) and its various modules (see FIG. 3) implement tracing and logging functionality according to an embodiment of the present invention. This will be discussed in detail in the next sub-section of this DETAILED DESCRIPTION section. For the rest of this sub-section, the hardware and software environment, in which logging agent 282 operates, will be discussed in detail.

As shown in FIG. 2, and as will be readily appreciated by those of ordinary skill in the art, user A sub-system 104 is, in many respects, representative of the various computer sub-system(s) in the present invention. Several portions of sub-system 104 will now be discussed in the following paragraphs.

Sub-system 104 may be a laptop computer, tablet computer, netbook computer, personal computer (PC), a desktop computer, a personal digital assistant (PDA), a smart phone, or any programmable electronic device capable of communicating with the client sub-systems via network 114. Logging agent software 282 is a representative piece of software, and is a collection of machine readable instructions and data that is used to create, manage and control certain software functions that will be discussed in detail below.

Sub-system 104 is capable of communicating with other computer sub-systems via network 114 (see FIG. 1). Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client sub-systems.

It should be appreciated that FIGS. 1, 2, and 3, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, sub-system 104 is shown as a block diagram with many double arrows. These double arrows (no separate reference numerals) represent a communications fabric, which provides communications between various components of sub-system 104. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 258 and persistent storage 260 are computer-readable storage media. In general, memory 258 can include any suitable volatile or non-volatile computer-readable storage media. It is further noted that, now and/or in the near future: (i) external device(s) 264 may be able to supply, some or all, memory for sub-system 104; and/or (ii) devices external to sub-system 104 may be able to provide memory for use by sub-system 104.

Logging agent software 282 is in many respects representative of the various software modules of the present invention and is stored in persistent storage 260 for access and/or execution by one or more of the respective computer processors 254, usually through one or more memories of memory 258. Persistent storage 260 is at least more persistent than a signal in transit is, but the persistent storage may, of course, be substantially less persistent than permanent storage. Logging agent software 282 may include both machine readable and performable instructions and/or substantive data (that is, the type of data stored in a database). In this particular embodiment, persistent storage 260 includes a magnetic hard disk drive. To name some possible variations, persistent storage 260 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 260 may also be removable. For example, a removable hard drive may be used for persistent storage 260. Other examples include optical and magnetic disks, thumb drives, and smart cards that are inserted into a drive for transfer onto another computer-readable storage medium that is also part of persistent storage 260.

Communications unit 252, in these examples, provides for communications with other data processing systems or devices external to sub-system 104, such as client sub-systems 102, 106, 108, 110. In these examples, communications unit 252 includes one or more network interface cards. Communications unit 252 may provide communications through the use of either or both physical and wireless communications links. Any software modules discussed herein may be downloaded to a persistent storage device (such as persistent storage device 260) through a communications unit (such as communications unit 252).

I/O interface(s) 256 allows for input and output of data with other devices that may be connected locally in data communication with server computer 250. For example, I/O interface(s) 256 provides a connection to external device set 264. External device set 264 will typically include devices such as a keyboard, keypad, a touch screen, and/or some other suitable input device. External device set 264 can also include portable computer-readable storage media such as, for example, thumb drives, portable optical or magnetic disks, and memory cards. Software and data used to practice embodiments of the present invention, for example, logging agent 282, can be stored on such portable computer-readable storage media. In these embodiments the relevant software may (or may not) be loaded, in whole or in part, onto persistent storage device 260 via I/O interface set 256. I/O interface(s) 256 also connects in data communication with display device 262.

Display device 262 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Figure 4:
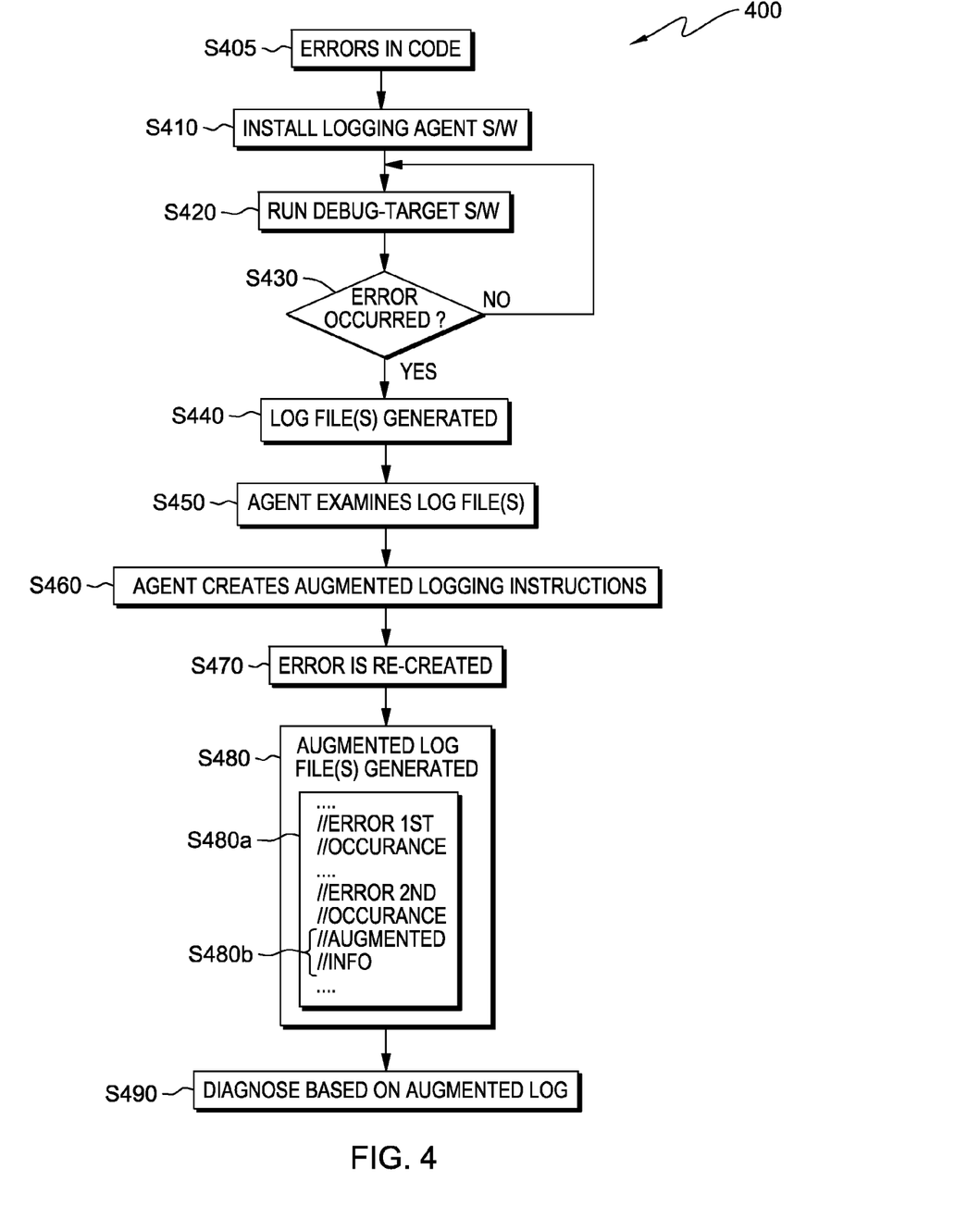
FIG. 4 is a flowchart showing a process according to an embodiment of the present invention.

As shown in process flowchart 400, processing begins at step S405, where a computer program is provided which has errors in its code. In this example, the computer program with errors is debug-target software 280 (see FIG. 2). In this example, debug-target software 280 is stored and executed entirely on user A computer 250. Alternatively, this software could be distributed among various computers, such as the various sub-systems 102, 104, 106, 108, 110 shown in FIG. 1.

The errors in code are representative of the inevitable errors (and associated need for software support) that arise while running a typical software program (at least in its early stages, if not for entire useful life of the particular piece of software). Errors are increasingly difficult to debug. The difficulty partly emanates from the volume of software available and the vast number of vendors producing software. For instance, today, a typical home computer includes: (i) system software (such as the operating system); (ii) application software (such as a word processor); and (iii) utility software (such as booting software). The previous list is only part of the entire software realm. Typically, with every release of a software program, the size of the program (such as debug-target software 280) increases as programmers: (i) add new features to the software (which tends to add new bugs); and/or (ii) add fixes to the software to fix known bugs. Software developers take great efforts to avoid programming mistakes and to anticipate all user actions. Nevertheless, software errors are a fact of life and likely to remain so.

Process 400 proceeds to step S410, where logging agent software is installed. More specifically, as shown in FIG. 2, logging agent software 282 is installed on user A computer 250 along with debug-target software 280 previously installed in step S405. Alternatively, the logging agent software may be located on a different computer, or distributed among multiple computers (although these alternatives are not necessarily preferred). In this example, logging agent software is downloaded from support sub-system 102 through network 114 to user A sub-system 104 so that it can be installed on user A's computer 250 (see FIG. 2). Alternatively, the logging agent software may be delivered to user A's computer by other methods.

The software structure of logging agent software 282 is shown in FIG. 3, but it is noted that this is just one possible way to structure the code making up logging agent software 282. Logging agent software 282 (sometimes hereinafter simply referred to as "the agent") can be applied to all kinds of various software applications. Alternatively, the agent may be made to be more specialized to work with only a particular category of software, or even a single particular software program as the debug-target of the agent.

Processing proceeds to step S420, where debug-target software 280 is run on user A computer 250. Step S420 intermittently proceeds to step S430, where a determination is made as to whether an error has occurred in the debug-target software 280 (see FIG. 2). This error determination of step S430 is made by conventional error detection techniques. For example, the operating system (not separately shown) of user A computer 250 (see FIG. 2) may participate in this conventional checking for errors.

Processing proceeds to step S440, where a first set of log file(s) are generated. The log file(s) may be generated by: (i) debug-target software 280 (see FIG. 2); (ii) the operating system software (not separately shown) of user A computer 250 (see FIG. 2); (iii) other software (not separately shown) running on user A computer 250; and/or (iv) various combinations of the foregoing. Although the flowchart for process 400 (see FIG. 4) shows the generation of the first set of log file(s) as occurring after detection of an error condition at step S430, the first set of log file(s) may, alternatively or additionally, be: (i) generated continuously during normal operations of the computer (step S420); and/or (ii) generated at the same time that the error is being detected at step S430.

To give an example of how steps S420 to S440 typically play out, sometimes a word processor application (the debug-target software in this example) "freezes." After the freeze, the operating system displays a "pop-up" window. This window informs the user that the word processing application has stopped responding, which strongly suggests that an error has been caused by the word processing application. In this example, the word processing application and/or the operating system will "dump" data from a standard stream (and/or other sources) to one or more log file(s). Conventionally, this set of log file(s) is later used for diagnostic purposes by teams of experts trying to resolve the error based on the log file(s). However, that is not what happens next in process 400 according to an embodiment of the present invention.

Processing proceeds to step S450, where logging agent software 282 (see FIG. 2) examines the first set of log file(s) previously generated at step S440. More specifically, examine logs mod 330 of logging agent software 282 (see FIG. 3) performs this examination of the first set of log file(s) which were previously generated by various code in user A's computer 250 (see FIG. 2) without the assistance of agent 282. By determining what logging and tracing information is available without the agent, the agent will be in a better position to make improvements to the logging and tracing process. In some embodiments, the examination of step S450 will focus on the call stack trace portion of the first set of log file(s) and/or arguments in the call stack trace portion of the first set of log file(s).

Processing proceeds to step S460, where the agent creates augmented logging instructions in the form of a "trace specification." More specifically, create augmented logging mod 335 creates the trace specification. The trace specification is code that instructs the computer to perform certain kinds of logging upon occurrence of an error similar to the error that has previously occurred at step S430. The trace specification may, or may not, cause creation of any additional new log file(s), but it will cause at least some new and different information to be recorded in the log file(s) that are recorded the next time a similar error is encountered. This new and different information will herein be referred to as "augmented logging information." This augmented logging information is information over and above what was included in the first set of log file(s) generated at step S440 and then examined at step S450.

Figure 5A:
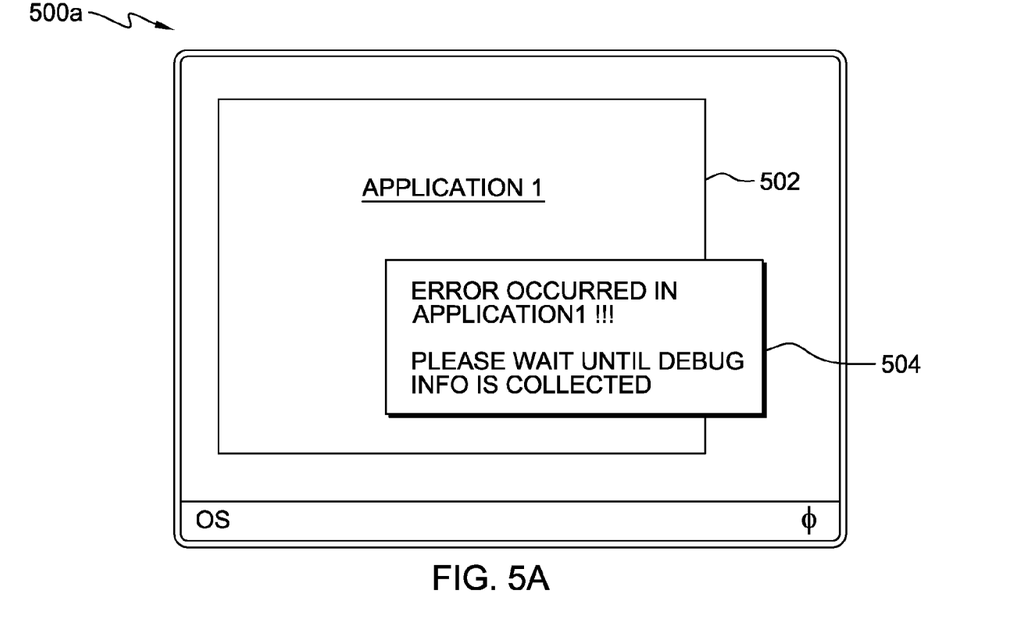
FIG. 5A is a first screenshot generated by the first embodiment computer system.

Processing proceeds to step S470, where the error, detected at step S430, is intentionally re-created (or instantiated) again. The re-instantiated error is automatically, and without human intervention, re-created by re-create error mod 340 (see FIG. 3). In this example, the re-creation of the error involves: (i) restarting debug-target software 280 (see FIG. 2); and (ii) automatically operating the debug-target software to once again give rise to the data processing conditions that made the error happen back in step S430. When the debug-target software is restarted, it may be restarted at an appropriate status for making the error happen again. In other words, this "restart" may not correspond to "where the user started" back at the start of step S420. As shown in FIG. 5A, screenshot 500a (including application window 502 and error window 504) corresponds to step S470. Having to restart the debug-target software is one possibility. It is also possible that, assuming the error can be reproduced on the debug-target software without restarting, the augmented logs can be produced without having to restart. One possible implementation would be using the capability of Java to re-instrument classes without restarting the JVM (as discussed below).

Processing proceeds to step S480, where the augmented logging instructions (in the form of a trace specification) is used to generate augmented logging information. As shown in the block representing step S480 in FIG. 4, in this example, the trace specification causes the augmented logging information 480b to be appended to the information from the first set of log file(s) to create a single file called second set of log file(s) (or, simply, second log file) 480a. More specifically, apply augmented logging mod 345 (see FIG. 3) controls generation of the second log file so that it will include augmented logging information 480b. Alternatively, the augmented logging information can be presented, displayed and/or stored in other ways, other than inclusion in a "log file."

Figure 5B:
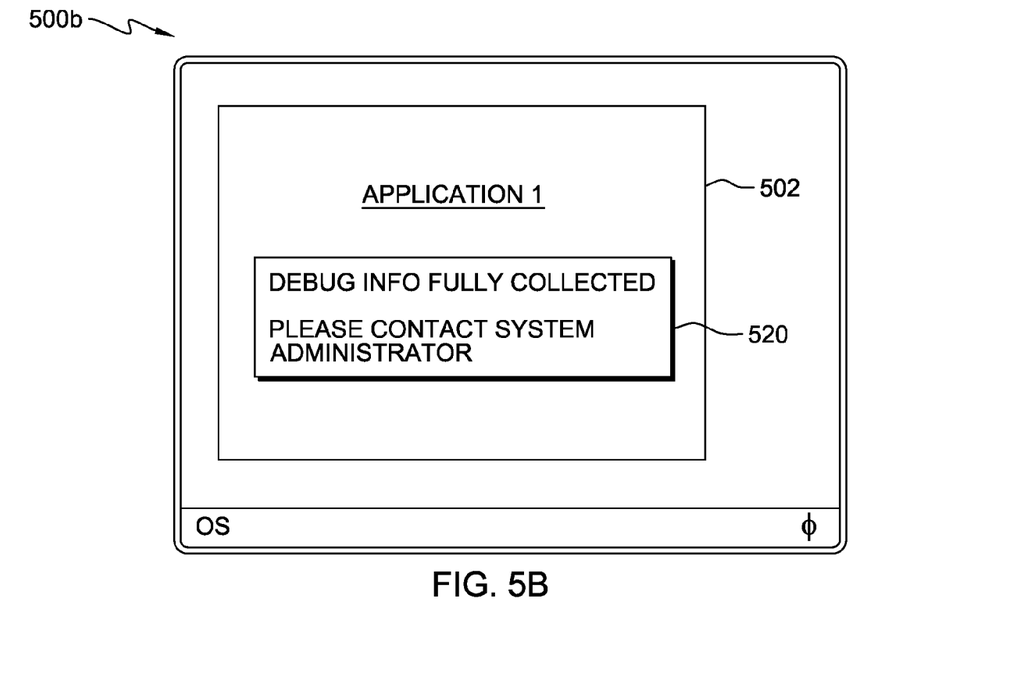
FIG. 5B is a second screenshot generated by the first embodiment computer system.

Regardless of how the augmented logging information is presented, displayed, communicated and/or stored, the augmented logging information should preferably be readily available for debugging and/or diagnostic processes. As shown in FIG. 5B, screenshot 500b (including application window 502 and status window 520) corresponds to step S480. Now that the agent has captured augmented debug information, the user is informed to contact the system administrator (who is at support sub-system 102 (see FIG. 1)).

Processing proceeds to S490, where experts (of the human and/or artificial intelligence variety) diagnose based on the augmented log file(s) generated according to the trace specification of the present invention. The augmented logging information 480b will generally provide the professionals at support sub-system 102 with greater insight and deeper understanding of the cause(s) of the error. At least in some cases, this additional information will reduce time, effort and/or cost that it takes the support team to determine root causes of the error based upon inadequate, conventional debug information. It is not always the case that a distinct person or role such as system administrator or support should be contacted in order to properly exploit the augmented log. It is certainly one possibility. But there are situations, for example, with business application development where the augmented log maybe sufficient for the business application developer to make progress without support assistance. It could also be that the end user of the invention is himself the system administrator.

III. Further Comments and/or Embodiment(s)

Some embodiments of the present invention relate to automated code instrumentation for capture of troubleshooting data based on a failure stack trace. Supporting software is increasingly complex and it is difficult to obtain focused debug information with typical systems integrating numerous components from various origins and vendors. Some embodiments of this invention address the problem of capturing debug information that is: (i) specifically relevant to the occurrence of a problem; and (ii) collected from all involved components of the system regardless of their origin or tracing capabilities. When a failure happens in a process, a number of log files usually contain information that can be used to attempt to determine the problem.

However, the information in these log files is often lacking much detail about the state of the process at the moment of the failure. Any given stack trace will generally only show a list of methods invoked that lead to the problem, but will not include any information on the value of arguments passed to the methods, or the state of the objects involved in the call stack.

The message associated with a stack trace only rarely gives enough data or context to fully identify the problem and all of its causes. As a result, it is often necessary to reconfigure the system (usually requiring restart) and capture more diagnostic trace in order to obtain better context information for the failure situation. These steps are manual, and typically require several interactions with the software support team. Furthermore even when the most relevant diagnostic traces are enabled, it is often the case that the log files are augmented with a lot of information that is not immediately relevant to the specific failure condition, making it difficult to exploit the data of the relevant diagnostic traces.

Some embodiments of this invention will: (i) automatically derive a trace specification, upon occurrence of a software problem; (ii) apply the trace specification to all relevant components of the system; and (iii) produce, under instruction of the trace specification, debug information that is directly relevant to the software problem.

Some embodiments of the present invention include augmentation of the log files with a carefully chosen diagnostic trace, which can potentially lead to one or more of the following advantages: (i) no manual intervention is required to accomplish the augmentation; (ii) the trace produced is more concise and directly relevant to the problem occurrence than are conventional log files; (iii) trace and state information can be captured from any component regardless of its tracing capability; and/or (iv) there is one consistent way to capture debug information regardless of origin of the software components involved.

Some embodiments of the present invention may reduce, or eliminate, the need for a technique called FFDC (first-failure data capture) to provide relevant state information at the time of failure, which can potentially lead to one or more of the following advantages: (i) no software development is needed to obtain the debug information; and/or (ii) any component can be involved in the trace and state capture.

Some embodiments of the present invention may reduce, or eliminate, the need for an interactive debugging session of the running process, which can potentially lead to one or more of the following advantages: (i) the debug information is captured automatically without manual intervention; (ii) no change in the system setup is needed to capture the trace information; and/or (iii) it takes little or no time to capture the debug information.

Some embodiments: (i) derive a trace specification from a failure occurrence, such as a stack trace; and (ii) apply code engineering modifications to at least some relevant components of the system in order to capture trace and state information that is directly related to the failure.

The following discussion will describe: (i) how some embodiments work through a deployment overview; (ii) how a trace specification is derived from errors; and (iii) how code engineering modifications are used to implement a specified trace.

Figure 6:
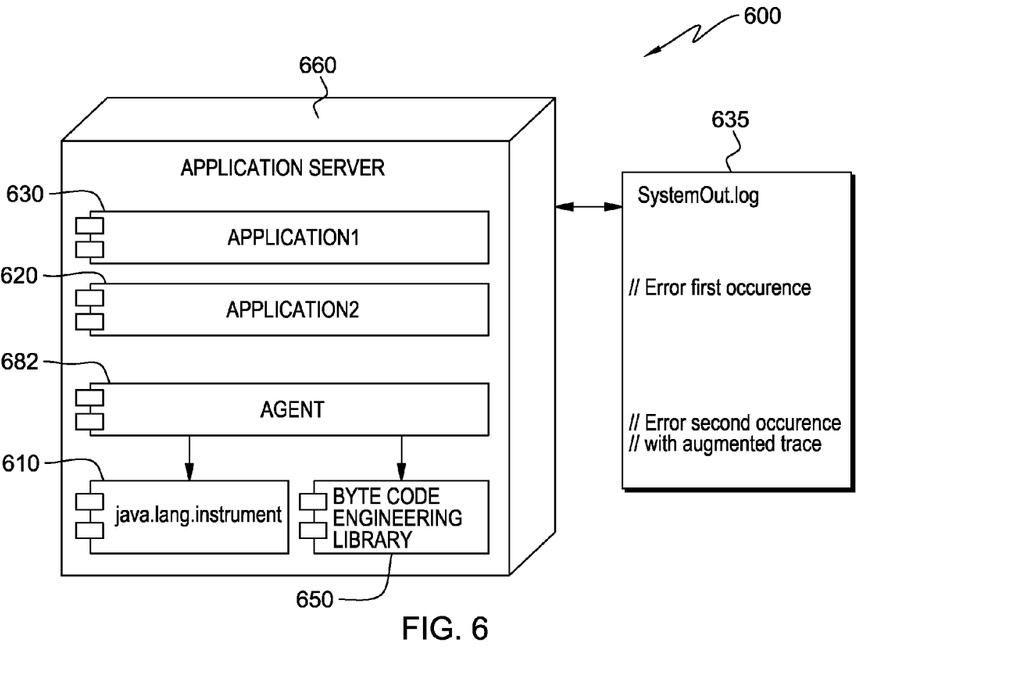
FIG. 6 is a schematic view of a second embodiment of a computer system according to the present invention.

Deployment Overview. As shown in FIG. 6, computer system 600 includes: java.lang.instrument block 610; Application 2 block 620; Application 1 block 630; SystemOut.log file (also called application server log) 635; Bytecode Engineering Library block 650; Application Server block 660; and agent block 682. Computer system 600 is implemented as a JVM (Java Virtual Machine) java agent deployed in an Application Server. The agent starts by capturing outputs sent to application server log 635. An application named "Application 1" is hosted on the server (see FIG. 6 at block 630). Application 1 block 630 produces an exception that is dumped in application server log 635. Agent block 682 detects a pattern of a stack trace in application server log 635. Agent block 682 derives from the stack trace a list of methods to be instrumented to capture more troubleshooting data. Upon second occurrence of the failure in Application 1 block 630, application server log 635 contains an augmented trace, which is augmented by the instrumented list of methods derived from the stack trace.

For example, in the Application Server of this embodiment, the files SystemOut.log and SystemErr.log (not shown) are the usual log files. This two file set of log files captures the standard and error output. Such log files can be monitored or the content appended to them can be intercepted programmatically by agent 682 running on the server.

The trace specification derived from a stack trace will now be discussed. Applications trace their execution in a set of log files (that is, one or more log file). When a failure occurs, a stack trace is produced that indicates the type of error and a list of the method invocations that led to the error. In some embodiments, this list of methods is used as a trace specification in accordance with the following principles, which will now be discussed in the following paragraphs.

Each method listed can be instrumented through bytecode manipulation to capture relevant state information at the moment of its invocation.

The state information captured is not to be immediately dumped into the log files for every method invocation as it might render the log unreadable and impact performance of the system. Instead, the information is retained as long as the method that leads to its capture remains in the call stack.

The state information that can be captured for a given method and that would typically be relevant usually consists of: (i) the arguments to the methods; and/or (ii) its arguments and object instance members (for non-static methods).

The captured state information can be maintained by the trace agent as internal strings describing state, as well as weak references to live objects.

The fully qualified name of the method may not always be enough to identify a unique match, but the stack giving information of caller and callee for each method allows to further reduce down the number of matches based on program binary analysis.

The stack trace may contain nested causes in the stack trace, and the methods involved in nested stack traces are to be instrumented as well.

The top method of the stack trace, or the top method of the most nested cause when such causes exist, are to be instrumented to: (i) catch the exception that was initially found in the log; (ii) dump the state information collected up to this point of the invocation; and (iii) to re-throw the same exception so that the system continues to behave identically, albeit with more precise traces in the log.

A set of common methods such as those provided by the runtime itself can be filtered out of this tracing facility to avoid capturing too much information or impacting performance. With respect to item (iii) in the preceding paragraph, typically this means the core JDK classes and methods found in packages such as: java.*, javax.*, sun.*, sunw.*, com.sun.*, org.*, org.w3c.*, and/or org.xml.*. It could also include application server specific packages such as: com.ibm.*, weblogic.*, and/or org.jboss.*. In an actual implementation the list of packages to be ignored for instrumentation should be configurable. This is often the case for tools that perform bytecode instrumentation that a list of packages can be specified so that a selection of packages can be ignored. The state information associated with those classes may very well be relevant, but the performance impact of instrumenting low level/very often used methods could outweigh the benefit of extra state information (it could simply lead to too much information). In this way, the state information that is relevant for troubleshooting should be available at the level of the application specific classes.

Code engineering modifications will now be discussed. The Java platform supports runtime bytecode engineering. With Java 6 instrumentation API (application program interface), the classes can be transformed upon first load as well as re-transformed at a later time. Some embodiments may be implemented as a java agent performing bytecode instrumentation of selected methods to support state information capture and trace as per the principles described above. Some possible transformations include first, second and third types, which will now be discussed respectively in the following paragraphs.

In a first transformation type, upon method entry insert a callback to the invention code to store state information about this method call (argument values, member values for non static calls) in a thread local stack structure.

In a second transformation type, upon method exit (that is, all types of exit whether normal return or exception) insert a callback to the invention code to drop reference to any captured data for this method in this thread by removing it from the thread local stack of data maintained by the invention code.

In a third transformation type, in the method identified to have thrown the exception causing the stack trace in the log, insert before the throw of the exception a callback to the invention code to dump in the server log all the state information captured for this thread and its current call stack.

Figure 7:
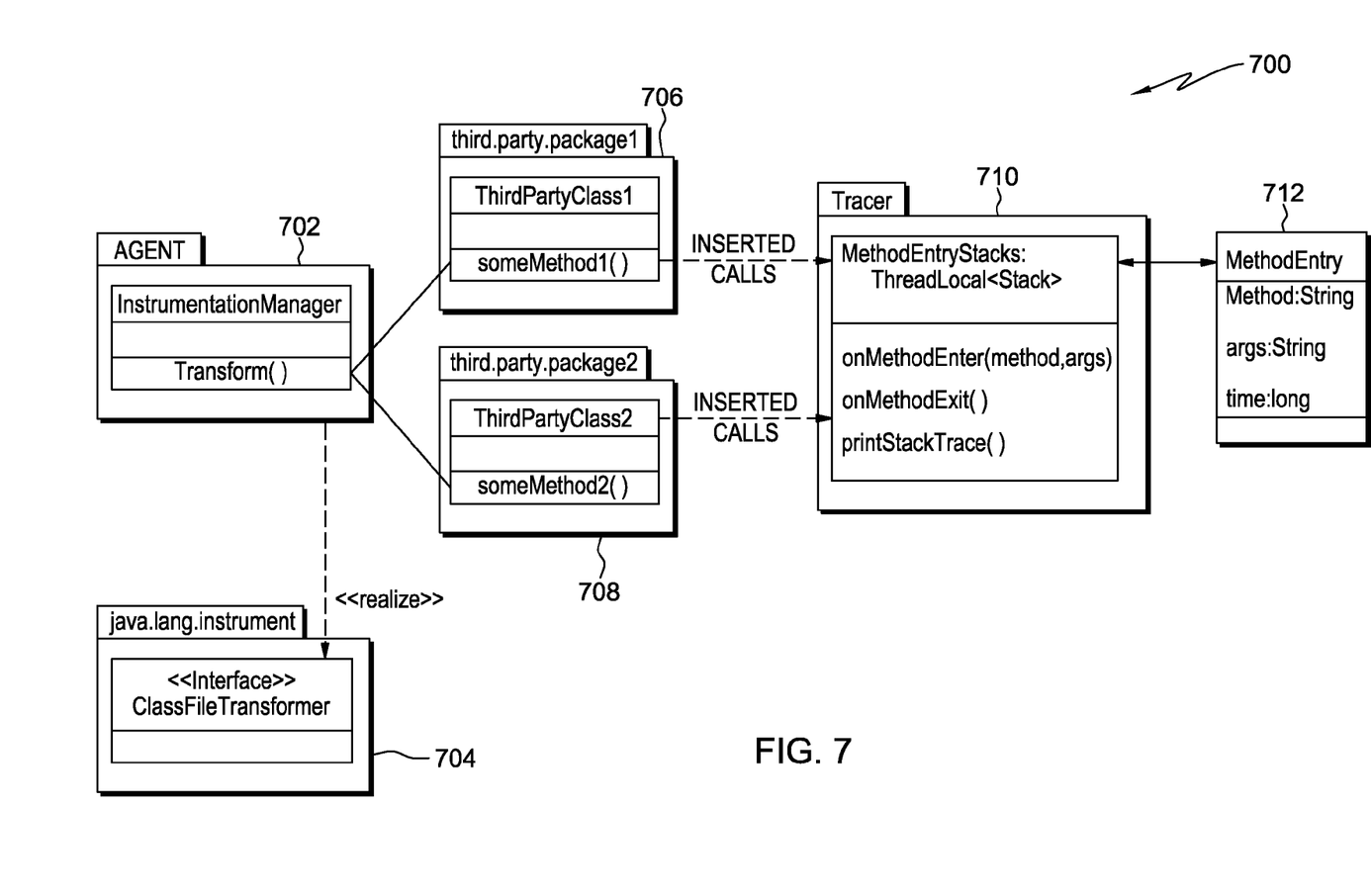
FIG. 7 is a diagram helpful in explaining operation of the second embodiment computer system.

As shown in FIG. 7, diagram 700 includes: agent block 702; java.lang.instrument block 704; third.party.package1 block 706; third party.package2 block 708; tracer block 710; and methodentry block 712. Class diagram 700 illustrates interactions between an embodiment of the present invention and instrumented code. The instrumented code supports implementation of the specified trace. Diagram 700 illustrates the interactions between the invention and instrumented code to support implementation of the specified trace. As further shown in diagram 700, an InstrumentationManager of agent block 702 performs a <<realize>> on <<interface>> ClassFileTransformer of java.lang.instrument block 704. ThirdPartyClass1 of block 706 and ThirdPartyClass2 of block 708 make inserted class to tracer block 710.

The way in which some embodiments perform instrumentation will now be discussed. The outcome of some embodiments is that the server log contains, along with the same stack trace seen upon initial failure, the following augmented information: (i) the arguments that were passed to all the methods involved in the failure; and/or (ii) the value(s) associated with the object instances that were involved in the failure (corresponding to all the non static methods in the stack).

A few examples of state data will now be discussed. State data can be any attribute value of an object that is related to the thread stack, as well as the value of arguments that were passed to the methods of the thread stack. For example it could be that some http connection was attempted and failed at some point, in this case the uniform resource locator (URL) that was used to attempt the connection is relevant to determine the root cause of failure. The URL information could have been passed as an argument to some connection method, or it could be an attribute of one of the objects directly involved in the thread stack. Another example could be a SQL query that fails, and the text of a prepared statement might be found either as an argument to one of the methods in the stack, or as an attribute of an object associated with the stack. It is a similar situation if the parsing of some XML document fails. It is possible that the location of the file (name of the XML file, or its location on a filesystem, etc.) could be found in the state data associated with the thread stack.

The concept of method throwing the exception, mentioned above, will now be discussed in more detail. The method throwing the exception is either a method defined by Application 1 block 630 (see FIG. 6) or a third party method that was invoked indirectly by Application 1 block 630. For example, it could be that Application 1 block 630 contains code to connect to a website to get some content. If the code of Application 1 is written with serviceability in mind, then when a connection failure occurs the log may contain information of what URL was attempted to be connected to, so that the error could appear as follows:

java.lang.RuntimeException: failure to connect
        at                              SomeApplication1Class.httpGet (SomeApplication1Class.java:38)
        at                              SomeApplication1Class.main (SomeApplication1Class.java:45)
    Caused by: java.net.UnknownHostException: www.some-invalid-address.com
        at    java.net.PlainSocketImpl.connect(PlainSocketImpl.java:227)
        at    java.net.SocksSocketImpl.connect(SocksSocketImpl.java:377)
        at java.net.Socket.connect(Socket.java:539)
        at java.net.Socket.connect(Socket.java:488)
        at sun.net.NetworkClient.doConnect(NetworkClient.java:175)
        at    sun.net.www.http.HttpClient.openServer(HttpClient.java:407)
        at    sun.net.www.http.HttpClient.openServer(HttpClient.java:542)
        at    sun.net.www.http.HttpClient.<init>(HttpClient.java:246)
        at     sun.net.www.http.HttpClient.New(HttpClient.java:319)
        at     sun.net.www.http.HttpClient.New(HttpClient.java:336)
        at            sun.net.www.protocol.http.HttpURLConnection.getNewHttp Client(HttpURLConnection.java:980)
        at            sun.net.www.protocol.http.HttpURLConnection.plainConnect(HttpURLConnection.java:921)
        at            sun.net.www.protocol.http.HttpURLConnection.connect(HttpURLConnection.java:846)
        at            sun.net.www.protocol.http.HttpURLConnection.getInputStream(HttpURLConnection.java:1182)
        at                            SomeApplication1Class.httpGet (SomeApplication1Class.java:28)
    . . . 1 more In the above, the URL "www.some-invalid-address.com" can be seen directly in the log and that is useful information for troubleshooting. But it is often the case that Application 1's code will not display all relevant information, and the stack trace in the log file appears as follows:

java.lang.RuntimeException: failure to connect
        at                              SomeApplication1Class.httpGet (SomeApplication1Class.java:38)
        at                              SomeApplication1Class.main (SomeApplication1Class.java:45)

In this case the ability to see what argument was passed to the httpGet method would tell debugging personnel that an attempt was made to connect to "www.some-invalid-address.com."

In some embodiments, one or more log files are monitored, in particular SystemOut.log (similarly SystemErrlog) in the present example of an Application Server. One reason for monitoring is to look for occurrence of stack trace in the log that can be used as input (the list of classes and methods) for the instrumentation step where the agent software modifies the classes and methods to provide more information the next time the exception occurs.

Some (not necessarily preferred) embodiments may operate based on the assumption that the debug-target application is designed to provide enough context information relating to the incident trace about the business objects involved so that another system can make an attempt to reproduce. However, other embodiments of the present invention are programmed to avoid the assumption that the debug-target application will be able to provide sufficient context information. These embodiments only assume that a standard error trace is available. As will be appreciated by those of skill in the art, this standard error trace typically does not contain enough context information to attempt to reproduce on another system.

Some (not necessarily preferred) embodiments may operate based on the assumption that the debug-target application is designed so that "Business Objects can be cloned" or that it is possible to "retrieve business object data through a service layer." However, some embodiments of the present invention are programmed to avoid making any assumption on the design of the application other than that some failure produces a generic error stack trace.

Some (not necessarily preferred) embodiments operate based on the assumption that an error, or other issue, can be reproduced in a totally separate environment. However, it is noted that, when it comes to troubleshooting, the environment in which the problem occurs may be very important and the fact that an issue can only be reproduced in some specific environment will serve to make things difficult for software support. Other embodiments of the present invention are programmed to avoid making this assumption. These embodiments will usually tend to be more generally applicable and/or robust.

IV. Definitions

The following paragraphs provide definitions for certain term(s) used in this document:

And/or: non-exclusive or; for example, A and/or B means that: (i) A is true and B is false; or (ii) A is false and B is true; or (iii) A and B are both true.

User: includes, but is not necessarily limited to, the following: (i) a single individual human; (ii) an artificial intelligence entity with sufficient intelligence to act as a user; and/or (iii) a group of related users.

What is claimed is:

1. A method for using a computer hardware set to execute instructions of a computer software set, the method comprising:
   generating a first log file set, including at least one log file, based upon how the computer hardware set executes the instructions of the computer software set;
   responsive to a first error in the execution of the computer software set, examining at least a portion of the first log file set; and
   creating, based at least in part upon the examination of the first log file set, augmented logging instructions for generating, upon any occurrence of an error similar to the first error, augmented logging information including state information relating to the occurrence of the respective error, wherein the state information includes a set of arguments passed to one or more methods of the computer software set;
   causing an occurrence of a second error similar to the first error;
   generating augmented logging information responsive to the occurrence of the second error according to the augmented logging instructions; and
   performing debugging based, at least in part, on the augmented logging information wherein:
   at least a portion of the augmented logging information is not included in the first log file set; and
   the examining, creating, and causing steps are performed automatically, and substantially without human intervention, by agent software running on the computer hardware set.

2. The method of claim 1 wherein the augmented logging instructions cause the augmented logging information to be included in a second set of log files, including at least one log file.

3. The method of claim 1 wherein the augmented logging information includes call trace information.

4. The method of claim 1 wherein the creating step includes the following sub-steps:
   creating a trace specification designed to specify the augmented logging information; and
   instrumenting the trace specification by providing machine readable instructions to obtain the augmented logging information.

5. A computer program product for use with a computer hardware set that executes instructions of a computer software set, the computer program product comprising:
   a non-transitory computer-readable storage media set including at least one storage medium; and
   program instructions stored on the media set;
   wherein:
   the program instructions comprise:
      first instructions programmed to generate a first log file set, including at least one log file, based upon how the computer hardware set executes the instructions of the computer software set,
      second instructions programmed to, responsive to a first error in the execution of the computer software set, examine at least a portion of the first log file set,
      third instructions programmed to create, based at least in part upon the examination of the first log file set, augmented logging instructions for generating, upon any occurrence of an error similar to the first error, augmented logging information including state information relating to the occurrence of the respective error, wherein the state information includes a set of arguments passed to one or more methods of the computer software set,
      fourth instructions programmed to cause an occurrence of a second error similar to the first error,
      fifth instructions programmed to generate augmented logging information responsive to the occurrence of the second error according to the augmented logging instructions, and
      sixth instructions programmed to perform debugging based, at least in part, on the augmented logging information; and
   at least a portion of the augmented logging information is not included in the first log file set.

6. The computer program product of claim 5 wherein the augmented logging instructions cause the augmented logging information to be included in a second set of log files, including at least one log file.

7. The computer program product of claim 5 wherein the augmented logging information includes call trace information.

8. The computer program product of claim 5 wherein the third instructions include the following:
   instructions defining a trace specification designed to specify the augmented logging information; and instructions programmed to instrument the trace specification to obtain the augmented logging information.

9. A computer hardware set that executes instructions of a computer software set, the computer hardware set comprising:
- a processor set;
- a non-transitory computer-readable storage media set including at least one storage medium; and
- program instructions stored on the media set and executable on the processor set;

wherein:

the program instructions comprise:
- first instructions programmed to generate a first log file set, including at least one log file, based upon how the computer hardware set executes the instructions of the computer software set,
- second instructions programmed to, responsive to a first error in the execution of the computer software set, examine at least a portion of the first log file set, and
- third instructions programmed to create, based at least in part upon the examination of the first log file set, augmented logging instructions for generating, upon any occurrence of an error similar to the first error, augmented logging information including state information relating to the occurrence of the respective error, wherein the state information includes a set of arguments passed to one or more methods of the computer software set,
- fourth instructions programmed to cause an occurrence of a second error similar to the first error,
- fifth instructions programmed to generate augmented logging information responsive to the occurrence of the second error according to the augmented logging instructions, and
- sixth instructions programmed to perform debugging based, at least in part, on the augmented logging information; and at least a portion of the augmented logging information is not included in the first log file set.

10. The system of claim 9 wherein the augmented logging instructions cause the augmented logging information to be included in a second set of log files, including at least one log file.

11. The system of claim 9 wherein the augmented logging information includes call trace information.

12. The system of claim 9 wherein the third instructions include the following:
- instructions defining a trace specification designed to specify the augmented logging information; and
- instructions programmed to instrument the trace specification to obtain the augmented logging information.

* * * * *